Feb. 4, 1969  V. SINGH  3,425,512
INTERNAL COMBUSTION ENGINES
Filed March 29, 1967
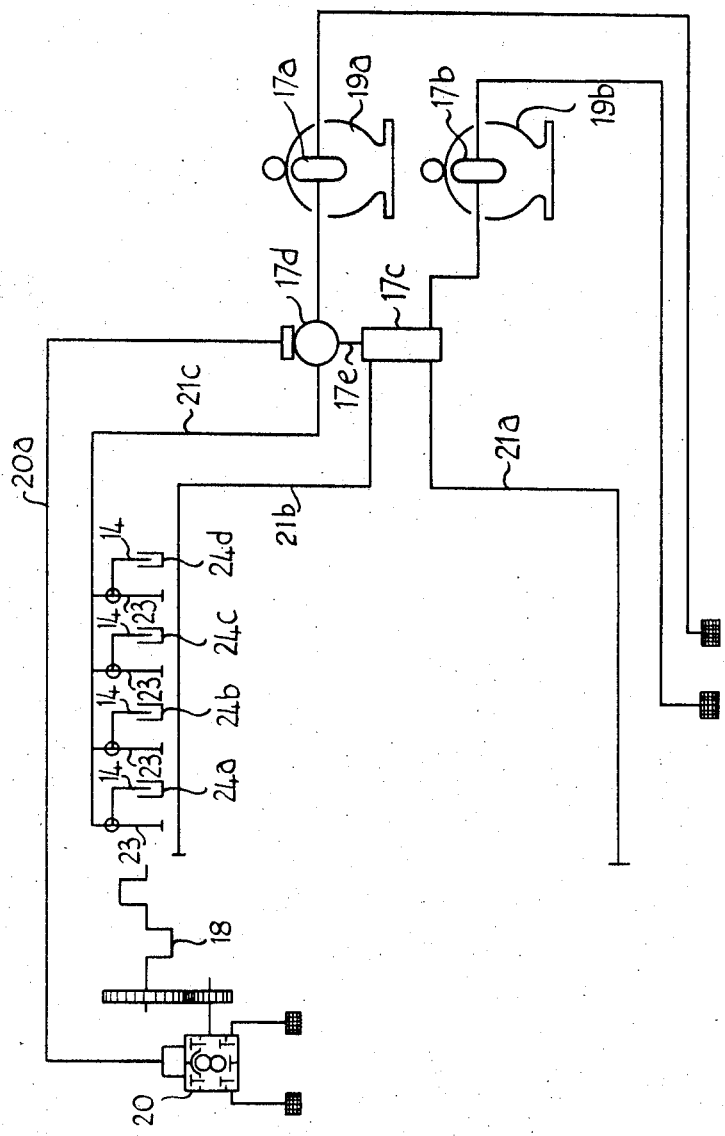
Virendra Singh
INVENTOR:
BY Bierman & Bierman

United States Patent Office 3,425,512
Patented Feb. 4, 1969

3,425,512
INTERNAL COMBUSTION ENGINES
Virendra Singh, Stockport, England, assignor to Mirrlees National Limited, a company of Great Britain, Northern Ireland and the Isle of Man
Filed Mar. 29, 1967, Ser. No. 626,858
Claims priority, application Great Britain, Mar. 17, 1967, 12,509/67
U.S. Cl. 184—6                    1 Claim
Int. Cl. F01m 1/02; F16n 7/00, 29/00

ABSTRACT OF THE DISCLOSURE

A lubrication system for an internal combustion engine having a pump, an ejector, a manifold and a valve for circulating lubricant while the engine is stationary to prevent the lubricant from forming carbon on the working parts of the engine.

---

This invention relates to internal combustion engines and is particularly, though not exclusively, applicable to large compression ignition engines of the order of 2000 B.H.P. and over, of the so-called opposed piston type the cylinders of which are usually upright.

In such large engines which are usually multi-cylinder it is sometimes necessary to circulate the lubricating oil around the engine for a period of time before starting up and/or after "shut down" while the engine is stationary. Such circulation after shut down is to prevent for one thing the oil in any inverted pistons from forming carbon on the inside surfaces of the piston thereby reducing the thermal conductivity from the piston to the oil. This circulation is usually achieved by having independent electrically driven oil pumps. On opposed piston engines of the kind referred to, a few further problems occur when thus circulating the oil after shut down. The oil will enter the inverted upper piston via the big-end bearings and the connecting rods. One of such inverted pistons of any such multi-cylinder engine may be close to the inner dead centre position and it would be possible for the piston and the liner above it, to become filled with oil, thereby creating a pressure head of oil. This could lead to leakage past the piston rings, and filling of the combustion chamber, which could result in hydraulic locking of inwardly opposed pistons, or dangerous combustion conditions. A further problem could result from such leakage oil entering the exhaust ports so causing fouling due to the formation of carbon deposits, and loss of engine performance.

The object of the present invention is to solve at least one of these problems.

According to the present invention an internal combustion engine having means for circulating lubricating fluid while the engine is stationary and having at least one inverted piston with lubricant extractor means operable while the engine is stationary is characterised in that the said means for circulating lubricating fluid comprises one power driven pump, a manifold coupling the output thereof to the lubrication system of the engine, a second power driven pump for the lubricating fluid, a change-over valve adapted in one position to connect the output of such second pump to the said manifold and in another position to connect the output of said second pump to at least one ejector forming the power element of the said lubricant extractor means and means coupling the said change-over valve to a control pump driven by the engine arranged by its output pressure to hold the change-over valve in the first position aforesaid.

In the accompanying drawing:

The figure is a general arrangement diagram of a lubricant system having four inverted pistons, and in accordance with one example of the present invention.

As shown, the lubricating system of a multi-cylinder opposed piston internal combustion engine has a pair of pumps 17a, 17b for the upper and lower crankshafts, of which only the upper crankshaft 18 is shown. These pumps are driven respectively by electric motors 19a and 19b. A small control pump 20 is coupled to the upper crankshaft to be driven thereby.

The output of the pump 17b is coupled to a manifold 17c which supplies the pipes 21a, 21b leading to the crankcases of the lower and upper crankshafts. Adjacent to this manifold is a biased change-over valve 17d which is operably connected by a pipe 20a to the control pump 20. The output of the pump 17a is connected to this change-over valve which in turn is connected by a pipe 17e to the manifold 17c and by a pipe 21c to an ejector 23 coupled to a dip tube 14 for each of the inverted pistons 24a, 24b, 24c and 24d. The ejectors 23 are each coupled to dip tubes 14 for their adjacent piston.

In operation, while the engine is running oil pressure from the control pump 20 holds the change-over valve 17d in one extreme position so that all the output from the pumps 17a and 17b is delivered to the manifold 17c so that the lubrication systems of the upper and lower crankshafts are both supplied by the delivery of pumps 17a and 17b. When the engine stops the pressure from the control pump 20 ceases and the biased change-over valve 17d moves to its other extreme position connecting the output of the pump 17a solely to the ejectors 23 which operate to suck oil from within the inverted pistons so as at all times to keep the level of the oil below the top edge of the piston skirts while the lubricant circulating pump 17b is running.

Before starting up the engine, the pumps 17a and 17b will be started so that 17b provides lubricant for the working surfaces via the manifold 17c while 17a operates the ejectors. As soon as the engine starts and the control pump 20 becomes effective, the change-over valve 17d is actuated so that the output of both pumps 17a and 17b deliver lubricant to the manifold 17c and continue so to do until the engine again stops.

I claim:
1. An internal combustion engine having means for circulating lubricating fluid while the engine is stationary and having at least one inverted piston with lubricant extractor means operable while the engine is stationary characterised in that the said means for circulating lubricating fluid comprises one power driven pump, a manifold coupling the output thereof to the lubrication system of the engine, a second power driven pump for the lubricating fluid, a change-over valve adapted in one position to connect the output of such second pump to the said manifold and in another position to connect the output of said second pump to at least one ejector forming the power element of the said lubricant extractor means and means coupling the said change-over valve to a control pump driven by the engine arranged by its output pressure to hold the change-over valve in the first position aforesaid.

References Cited

UNITED STATES PATENTS 1,836,637  12/1931  Woolson _____ 184–6
1,892,089  12/1932  Waseige _____ 184–6

HOUSTON S. BELL, JR., *Primary Examiner.*